US008135514B2

(12) United States Patent
Kelly et al.

(10) Patent No.: US 8,135,514 B2
(45) Date of Patent: Mar. 13, 2012

(54) AUTOMOTIVE SYSTEMS AND METHODS OF OPERATING VEHICLES

(75) Inventors: Leonard B. Kelly, Orion Township, MI (US); Yunjun Li, West Bloomfield, MI (US); Gregory G. Gordon, South Lyon, MI (US); Nancy McMahon, Rochester Hills, MI (US); Todd H. Barnes, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 12/412,012

(22) Filed: Mar. 26, 2009

(65) Prior Publication Data

US 2010/0250065 A1 Sep. 30, 2010

(51) Int. Cl.
*B60G 17/018* (2006.01)

(52) U.S. Cl. ..... 701/37; 280/5.5; 280/5.504; 280/5.514; 280/6.157; 362/37; 362/466; 362/487; 362/523

(58) Field of Classification Search ............... 701/37; 280/6.15, 6.157, 5.5, 5.504, 5.514; 362/37, 362/464, 465, 466, 487, 523
See application file for complete search history.

(56) References Cited

U.S. PATENT DOCUMENTS

| 4,616,847 A | 10/1986 | Kanai et al. |
| 7,063,333 B2 | 6/2006 | van Cayzeele et al. |

FOREIGN PATENT DOCUMENTS

| DE | 3223140 A1 | 12/1983 |
| DE | 3512047 A1 | 10/1985 |
| DE | 10256895 A1 | 6/2003 |
| DE | 10224522 A1 | 12/2003 |

OTHER PUBLICATIONS

German Office Action for German Patent Application No. 10 2010 010 040.4 mailed on Jun. 21, 2011.

*Primary Examiner* — Eric Culbreth
(74) *Attorney, Agent, or Firm* — Ingrassia Fisher & Lorenz, P.C.

(57) ABSTRACT

Automotive systems and methods for operating vehicles are provided. In an embodiment, when a speed sensor senses that the vehicle speed is above a first speed threshold and an ambient light sensor senses that an ambient light intensity is below a first intensity threshold, a controller provides a first command to a suspension system to lower a first end of a vehicle body to a second front trim height position relative to a horizontal plane, where the second front trim height position is below a first front trim height position, and to lower the second end of the body to a second rear trim height position relative to the horizontal plane, where the second rear trim height position is below a first rear trim height position.

17 Claims, 3 Drawing Sheets

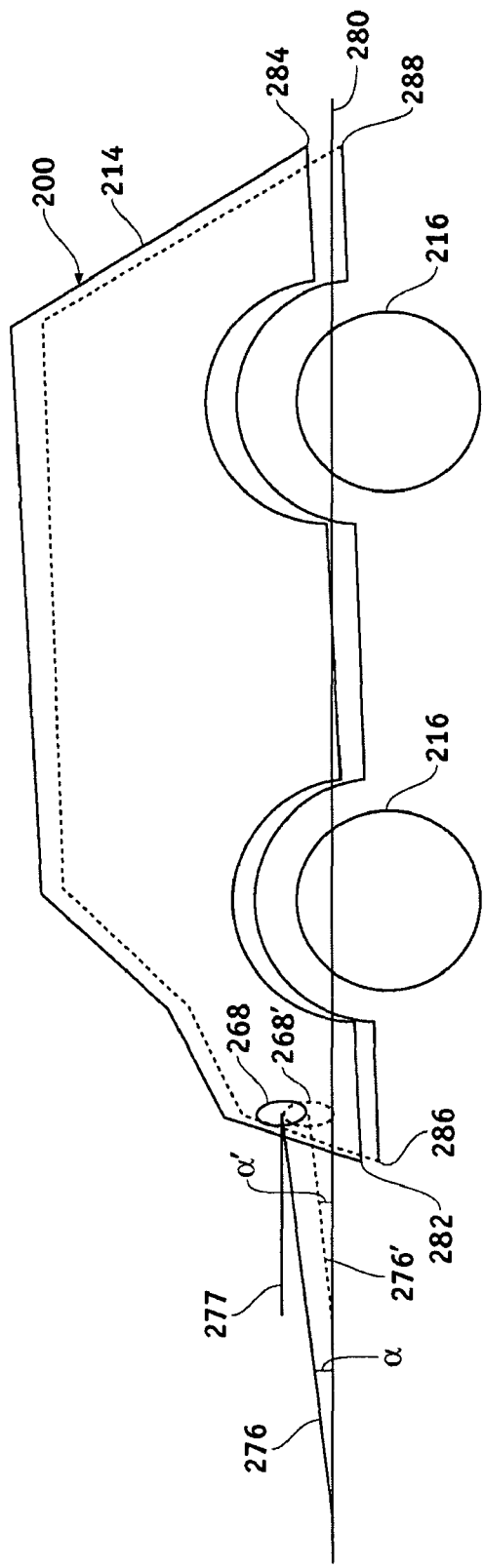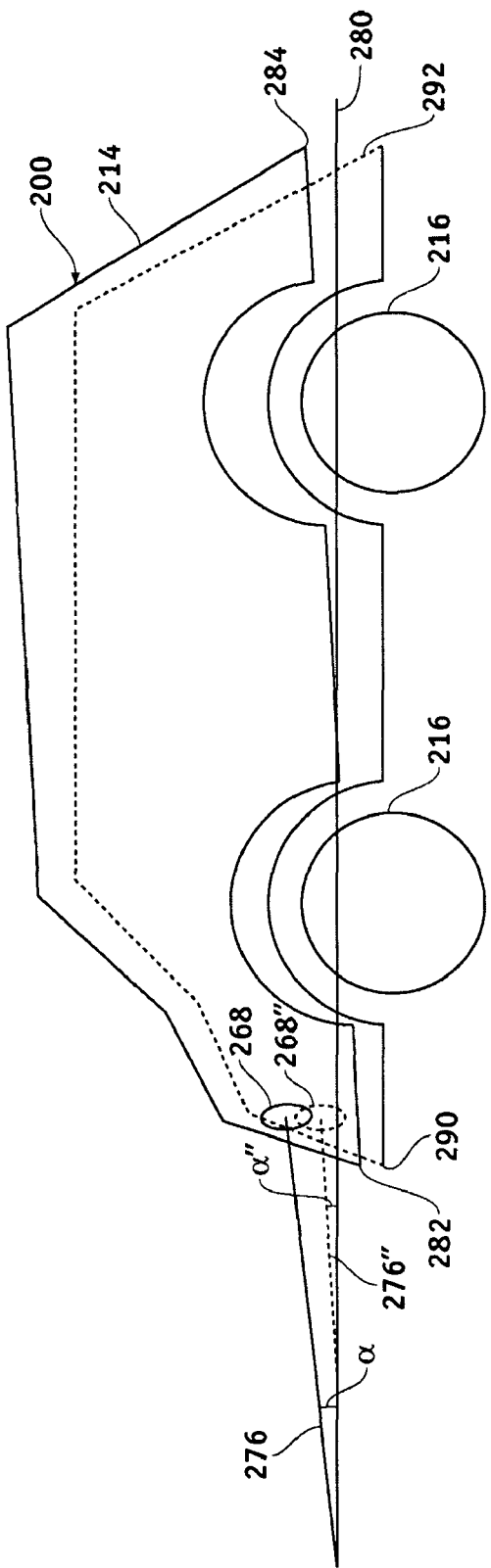

AUTOMOTIVE SYSTEMS AND METHODS OF OPERATING VEHICLES

TECHNICAL FIELD

The inventive subject matter generally relates to automotive systems, and more particularly relates to operating automotive systems.

BACKGROUND

Many vehicles include suspension leveling control systems that sense a height and/or a level of a vehicle body with respect to wheels of the vehicle. A suspension leveling control system is configured to adjust a suspension of the vehicle to level the vehicle. In this regard, a suspension leveling control system may include at least one height sensor that is configured to sense a position or measure the height of at least one wheel of the vehicle relative to the vehicle body (also known as "trim height position" or "trim height"). The height sensors may be any of a number of sensor types including digital sensors, optical sensors, resistive sensors, and transformer-type sensors. Typically, a height sensor adapted to sense trim height is integrated into the vehicle during vehicle manufacture.

In some cases, the suspension leveling control system may be employed to enhance fuel economy of the vehicle during vehicle operation. For example, the suspension leveling control system may be programmed to lower a trim height of a rear portion of the vehicle relative to its front portion to improve aerodynamics of the vehicle. Although fuel economy may be enhanced using such a suspension leveling control system, other undesirable issues may arise. In particular, lowering the rear portion of the vehicle relative to its front portion may undesirably change a headlamp inclination angle of the vehicle such that the headlamp inclination angle falls outside a headlamp inclination angle variation range.

Accordingly, it is desirable to have a system that improves a vehicle's fuel economy, while maintaining headlamp inclination angles within the inclination angle variation ranges. Furthermore, other desirable features and characteristics of the inventive subject matter will become apparent from the subsequent detailed description and the appended claims, taken in conjunction with the accompanying drawings and the foregoing technical field and background.

BRIEF SUMMARY

Automotive systems and methods for operating vehicles are provided.

In an embodiment, by way of example only, an automotive system is provided for use with a vehicle, the vehicle including a body having a first end and a second end, wherein the first end of the body is positionable at a first front trim height position, and the second end of the body is positionable at a first rear trim height position. The system includes an ambient light sensor, a speed sensor, a suspension system, and a controller. The ambient light sensor is adapted to sense an ambient light intensity and to provide signals indicating the ambient light intensity. The speed sensor is adapted to sense a vehicle speed. The suspension system is coupled to the body and is adapted to raise and lower the first end of the body relative to a horizontal plane and to raise and lower the second end of the body relative to a horizontal plane. The controller is in operable communication with the ambient light sensor, the speed sensor, and the suspension system, and is configured to receive data from the ambient light sensor and the speed sensor and to provide commands to the suspension system. When the speed sensor senses that the vehicle speed is above a first speed threshold and the ambient light sensor senses that the ambient light intensity is below a first intensity threshold, the controller provides a first command to the suspension system to lower the first end of the body to a second front trim height position relative to the horizontal plane, where the second front trim height position is below the first front trim height position, and to lower the second end of the body to a second rear trim height position relative to the horizontal plane, where the second rear trim height position is below the first rear trim height position.

In another embodiment, by way of example only, a method is provided for operating a vehicle having a body, including a first end and a second end, the first end of the body being positionable in a first front trim height position, and the second end of the body being positionable a first rear trim height position. The method includes receiving a first signal representative of a vehicle speed that is above a first speed threshold, receiving a second signal representative of a first ambient light intensity that is below a first intensity threshold, and providing a first command to a suspension system to lower the first end of the body to a second front trim height position relative to a horizontal plane, where the second front trim height position is below the first front trim height position, and to lower the second end of the body to a second rear trim height position relative to the horizontal plane, where the second rear trim height position is below the first rear trim height position, in response to receiving the first signal and the second signal.

DESCRIPTION OF THE DRAWINGS

The inventive subject matter will hereinafter be described in conjunction with the following drawing figures, wherein like numerals denote like elements.

FIG. 2 is a simplified, cross-sectional side view of a vehicle, according to an embodiment;

FIG. 4 is a simplified, cross-sectional side view of the vehicle of FIG. 2, according to another embodiment.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 1:
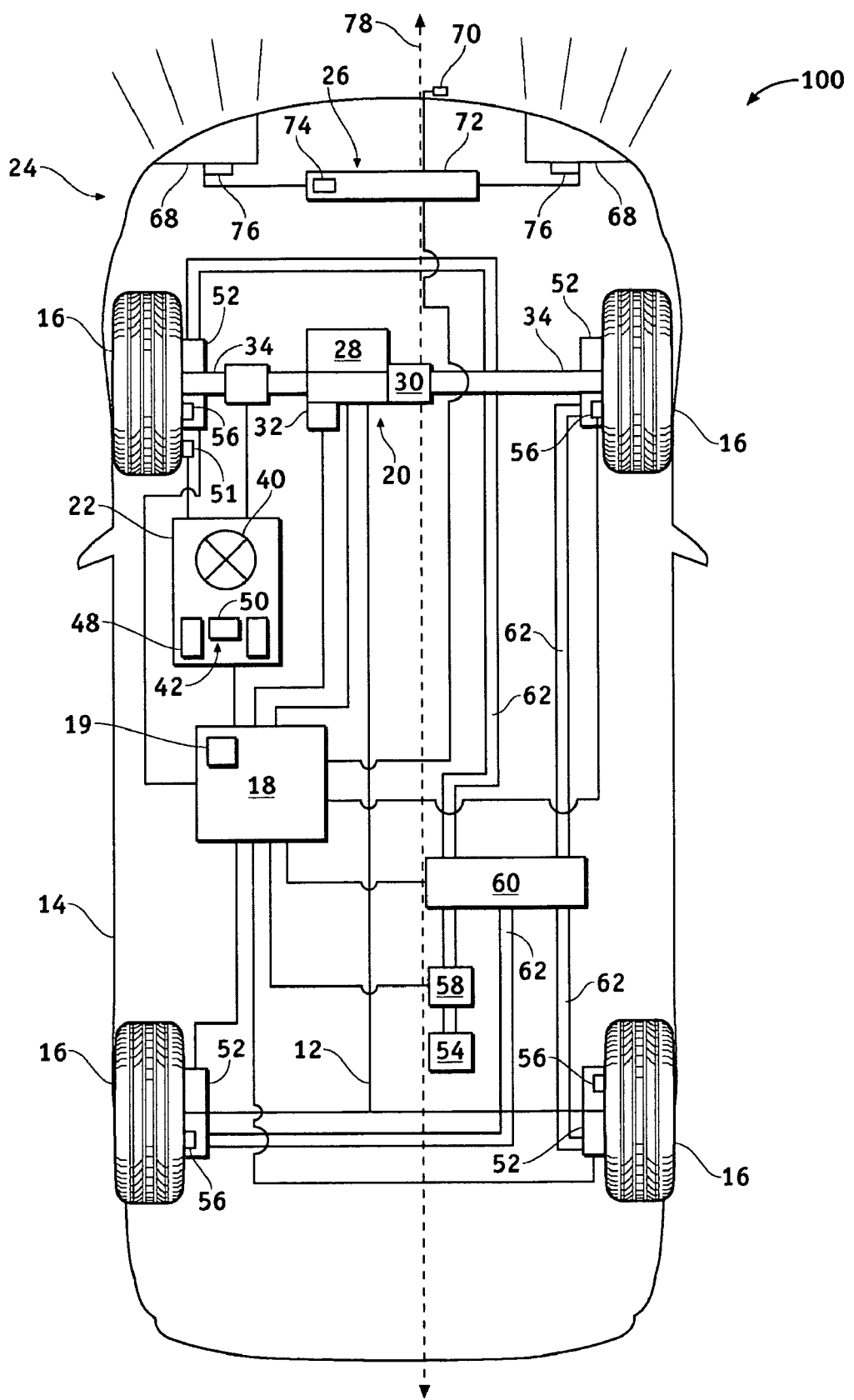
FIG. 1 is a schematic view of a vehicle, according to an embodiment.

FIG. 1 illustrates a vehicle 100, or "automobile," according to an embodiment. In an embodiment, the vehicle 100 is configured to operate with an improved fuel efficiency. In particular, when a vehicle speed is above a speed threshold, a front and rear trim height positions of the vehicle 100 are adjusted accordingly (e.g., both are lowered). Additionally, the vehicle 100 may adjust trim height positions to different levels depending on an ambient light intensity. For example, in dimmer ambient light environments, the adjustments to the trim height positions may not be as pronounced as in brighter ambient light environments.

The vehicle 100 includes a chassis 12, a body 14, four wheels 16, and various vehicle control systems. The body 14 is arranged on the chassis 12 and substantially encloses the other components of the vehicle 100. The body 14 and the chassis 12 may jointly form a frame. The wheels 16 are each rotationally coupled to the chassis 12 near a respective corner of the body 14.

The vehicle 100 may be any one of a number of different types of automobiles, such as, for example, a sedan, a wagon, a truck, or a sport utility vehicle (SUV), and may be two-wheel drive (2WD) (e.g., rear-wheel drive or front-wheel drive), four-wheel drive (4WD) or all-wheel drive (AWD). The vehicle 100 may also incorporate any one of, or combination of, a number of different types of engines, such as, for example, a gasoline or diesel fueled combustion engine, a "flex fuel vehicle" (FFV) engine (e.g., an engine that uses a mixture of gasoline and alcohol), a gaseous compound (e.g., hydrogen and/or natural gas) fueled engine, a combustion/electric motor hybrid engine, and an electric motor.

In an embodiment, the vehicle control systems are adapted to control the operation of the vehicle, and those systems include an electronic control system 18, an actuator assembly 20, an automotive control subsystem 22, a suspension system 24, and a headlamp system 26. The electronic control system 18 is in operable communication with each of the actuator assembly 20, the automotive control subsystem 22, the suspension system 24, and the headlamp system 26, and is configured to receive data from the actuator assembly 20, the automotive control subsystem 22, the suspension system 24, and the headlamp system 26, to process the received data, and to transmit commands to the actuator assembly 20, the automotive control subsystem 22, the suspension system 24, and the headlamp system 26 for controlling the operation of the vehicle 100. According to an embodiment, the electronic control system 18 includes various sensors and automotive control modules, or electronic control units (ECUs), such as a vehicle controller, at least one processor, and/or a memory which includes instructions stored thereon for carrying out the processes and methods as described below. In an embodiment, the electronic control system 18 may include a warning device 19, which may be adapted to provide a control signal to an indicator located in the cab of the vehicle 100. The indicator may include, for example, an audio speaker, a light emitting diode (LED), and/or a display device. Additionally, to communicate wirelessly with the other systems, the electronic control system 18 may also include a transceiver, a receiver, and an antenna, or another device suitable for transmitting and receiving data signals.

The actuator assembly 20 is configured to activate the vehicle 100 for operation in response to commands received from the electronic control system 18. According to an embodiment, the actuator assembly 20 includes a combustion engine 28, an electric motor/generator (or motor) 30, and a starter 32 coupled to the combustion engine 28. The starter 32 may be used for ignition of the combustion engine 28 and the electric motor 30, which are integrated such that both are mechanically coupled to at least some of the wheels 16 through one or more drive shafts 34. The motor 30 includes a stator assembly (including conductive coils) and a rotor assembly (including a ferromagnetic core), which may include multiple electromagnetic poles (e.g., sixteen poles), as is commonly understood. In other embodiments, vehicle 100 may be a hybrid or electric vehicle and the actuator assembly 20 may include other components in addition to those previously-mentioned or may not include some of the previously-mentioned components.

To control the operation of the vehicle 100, the automotive control subsystem 22 includes a steering system (e.g., steering wheel) 40 and a braking system 42. The steering system 40 is adapted to allow an operator to steer the vehicle 100 in a desired direction. In an embodiment, the steering system 40 may include a steering column (not shown) and various electronics and devices that are associated with conventional vehicle steering systems.

The braking system 42 is adapted to allow the operator to slow or stop the vehicle 100 and may include a brake pedal 48 and a braking system controller 50, in this regard. The brake pedal 48 may be in operable communication with the braking system controller 50 and may be adapted to provide a signal to the braking system controller 50 when the operator has actuated (e.g., depressed) the brake pedal. The braking system controller 50 may then transmit the signal to the electronic control system 18, which may, in turn, provide commands to the wheels 16 to reduce rotational speed. In some embodiments, a determination of whether to slow the vehicle 100 may depend on a speed of the vehicle 100. In this regard, the vehicle 100 may include a speed sensor 51. For example, the speed sensor 51 may communicate with one or more of the wheels 16 to sense the speed at which the wheels 16 rotate and may be adapted to provide a signal representative of the sensed speed to the electronic control system 18.

The suspension system 24 is included as part of the vehicle 100 to enhance operator comfort during vehicle operation by reducing shock and vibration through the vehicle 100. In an embodiment, the suspension system 24 includes four compressed air operated leveling devices 52, one associated with each wheel 16, a compressor/exhaust apparatus 54, trim height sensors 56, an optional pressure sensor 58, a valve block assembly 60, and a plurality of air lines 62. The leveling devices 52 may include air springs, air operated actuator, or hydraulic operated actuator, or electromagnetic operated actuator, etc. The leveling devices 52 receive air from an air source (such as ambient air from compressor/exhaust apparatus 54) through the plurality of air lines 62. In an embodiment, the air lines 62 couple the pressure sensor 58 to the valve block assembly 60. The pressure sensor 58 and the valve block assembly 60 receive signals from the electronic control system 18 to control compressed air communication between the compressor/exhaust apparatus 54 and each individual leveling device 52.

To determine whether additional compressed air is to be supplied to any given leveling device 52, the electronic control system 18 may receive data from the trim height sensors 56, which are configured to detect a position (e.g., a height) of each wheel 16 relative to the body 14. In this regard, the trim height sensors 56 may be disposed at any suitable location for sensing the height between sprung and unsprung masses. The trim height sensors 56 may comprise digital sensors, optical sensors, resistive sensors, transformer-type sensors or any other type of sensor capable of determining a height of one object with respect to another object. The optional pressure sensor 58 also provides a signal to the electronic control system 18 when the air pressure to any leveling device 52 falls below a predetermined pressure so that incremental pressure automatically may be provided to the respective leveling device 52.

Environmental visibility to the vehicle operator and visibility of the vehicle to others may be improved during daytime and/or nighttime vehicle operation by the headlamp system 26. The headlamp system 26 includes headlamps 68, one or more ambient light sensors 70, and a control module 72, in an embodiment. The headlamps 68 may be mounted to a front end of the body 14 in operable communication with the control module 72. Although two headlamps 68 are indicated, more or fewer headlamps 68 may be included in other embodiments.

In an embodiment, the headlamps 68 may be configured to turn on and/or off in response to commands received from the control module 72. In another embodiment, the headlamps 68 may be configured to gradually dim and/or brighten in response to commands received from the control module 72. The headlamps 68 may be manually turned on or off by the operator, in an embodiment. In another embodiment, the headlamps 68 may additionally or alternatively be automatically turned on or off by the control module 72.

According to an embodiment in which the headlamps 68 automatically turn on or off, a determination as to whether to turn the headlamps 68 on or off may depend on data sensed by the ambient light sensor 70. In this regard, the ambient light sensor 70 may be adapted to sense an intensity of ambient light present in an environment surrounding the vehicle 100 and to provide the sensed light data to the control module 72. The ambient light sensor 70 may comprise any type of sensor capable of measuring an intensity of ambient light.

In an embodiment, the control module 72 may include a processor 74, which receives and processes the sensed light data from the ambient light sensor 70, and transmits signals representative of the sensed light data to the electronic control system 18. In an embodiment, the control module 72 may be further configured to control illumination of the headlamps 68 (e.g., between a high beam and a low beam state). In another embodiment, the control module 72 may be capable of providing a command to a headlamp actuator 76, which may adjust an inclination angle of the headlamp 68.

In an optional embodiment, the control module 72 may cause the headlamps 68 to move between various lamp positions. FIG. 2 is a simplified, cross-sectional side view of a vehicle 200, according to an embodiment. The vehicle 200 includes a headlamp 268 mounted to a front end of a body 214. The headlamp 268 emits a first light beam (centerline indicated by line 276) at a first inclination angle α relative to a horizontal plane 280, when the headlamp 268 is disposed in a first lamp position. The first inclination angle α may be established during manufacture or may be adjusted during repair and/or maintenance. After adjustment to a second lamp position, the headlamp 268 may emit a second light beam (centerline indicated by line 277) at a second inclination angle relative to the horizontal plane 280. In an embodiment, an inclination angle of the headlamp 268 may be within a predetermined range, with respect to the horizontal plane 280.

Figure 3:
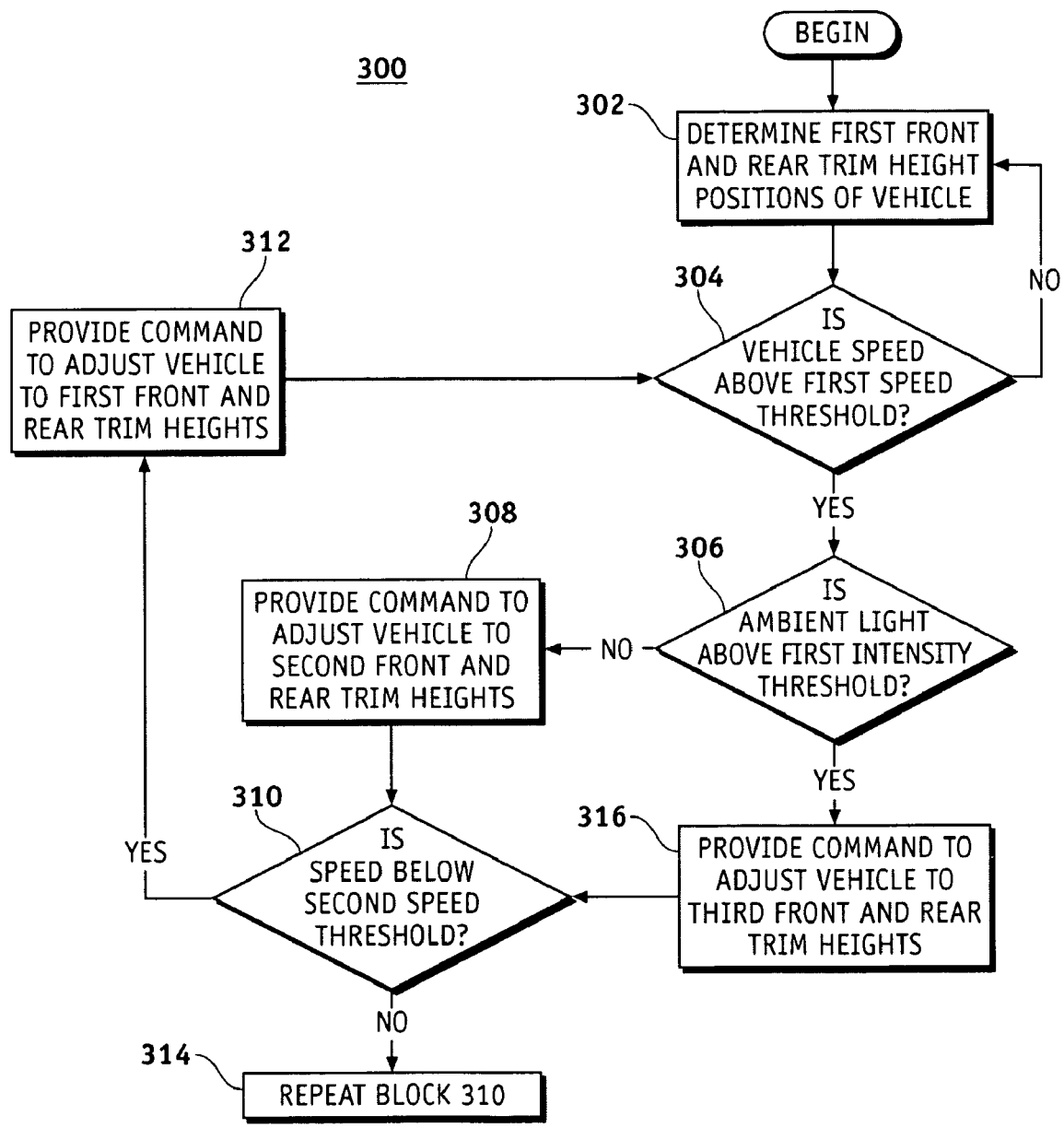
FIG. 3 is a flow diagram of a method of operating a vehicle, according to an embodiment.

FIG. 3 is a flow diagram of a method 300 of operating an automotive system, such as vehicle 200, according to an embodiment. In accordance with an embodiment, the method 300 beings when the automotive system determines a first front trim height position and a first rear trim height position of the vehicle at block 302. With reference to FIGS. 1-3, in an embodiment, the trim height sensors 56 (FIG. 1) sense the first front trim height position (e.g., first front trim height position 282) at a first end of the vehicle 200 (for example, at a wheel at the front end of the vehicle 200), and the trim height sensors 56 (FIG. 1) also sense the first rear trim height position (e.g., first rear trim height position 284) at a second end of the vehicle 200 (for example, at a wheel at the rear end of the vehicle 200). Signals representing the sensed trim height positions are transmitted to the electronic control system 18 (FIG. 1), which compares the first front trim height position and the first rear trim height position to default front and default rear trim height positions, which may have been established at the factory. In an embodiment, the first front and first rear trim height positions 282, 284 may be disposed on a single horizontal plane (e.g., a plane parallel to horizontal plane 280 (FIG. 2). In other embodiments, the first front trim height position 282 may be higher or lower than the first rear trim height position 284 relative to a horizontal plane 280. The first front and rear trim height positions 282, 284 are trim heights at which the vehicle 100 may experience a higher aerodynamic drag, which may decrease the vehicle's 100 fuel efficiency.

Next, a speed sensor senses a vehicle speed, and a determination is made as to whether the vehicle speed is above a first speed threshold at block 304. For example, the speed sensor 51 (FIG. 1) may sense the vehicle speed and may provide a signal to the electronic control system 18 (FIG. 1) representing the vehicle speed. The electronic control system 18 may determine whether the vehicle speed is above the first speed threshold. According to an embodiment, the first speed threshold is a speed at which the vehicle 100 may be on a highway, freeway, or smooth road that the vehicle 100 may not need higher ground clearance. For example, the first speed threshold may be a speed in a range of 30 mph to 75 mph, although the first speed threshold may be greater or less than the aforementioned range. When the vehicle speed is below the first speed threshold, blocks 302 and 304 reiterate. When the vehicle speed is above the first speed threshold, the method continues to block 306.

In an embodiment, the ambient light intensity is sensed, and a determination is made as to whether the ambient light intensity is above a first intensity threshold at block 306. In accordance with an embodiment, the ambient light sensor 70 (FIG. 1) may sense the first intensity of ambient light and may provide a first signal representing a first intensity measurement to the electronic control system 18. The electronic control system 18 may verify whether the first intensity measurement is greater than or less than a first intensity threshold, in an embodiment. According to an embodiment, when the first intensity measurement is below the first intensity threshold, the electronic control system 18 provides a command to the suspension system 24 (FIG. 1) to lower the first end of the body 214 of the vehicle 200 to a second front trim height position 286 relative to the horizontal plane 280, where the second front trim height position 286 is below the first front trim height position 282, and to lower the second end of the vehicle 200 to a second rear trim height position 288 relative to the horizontal plane 280, where the second rear trim height position 288 is below the first rear trim height position 284, block 308. The second from and rear trim height positions 286, 288 allow the vehicle 100 to have less aerodynamic drag than when in the first front and rear trim height positions 282, 284. A difference between the first front trim height position 282 and the second front trim height position 286 may be substantially equal to a difference between the first rear trim height position 284 and the second rear trim height position 288, in an embodiment. In other embodiments, the differences may not be equal to each other. In either case, the differences are such that a headlight inclination angle α' between the centerline 276' of the light beam and the horizontal plane 280 may be maintained within a predetermined acceptable range of angles. In an example, in some cases, headlight inclination angle α of a centerline 276 of the light beam may be substantially equal to headlight inclination angle α' of a centerline 276' of the light beam. In other embodiments, headlight inclination angle α of the centerline 276 of the light beam may be greater or less than headlight inclination angle α' of the centerline 276' of the light beam. The method 300 may continue to block 310, which will be discussed later.

FIG. 4 is a simplified, cross-sectional side view of a vehicle 200, according to another embodiment. With reference to FIGS. 1, 2, and 4 and referring back to block 306, according to another embodiment, when the first intensity measurement is above the first intensity threshold, the method continues to block 316 at which a command is provided from the electronic control system 18 (FIG. 1) to the suspension system 24 (FIG. 1) to lower the first end of the body 214 of the vehicle 200 to a third front trim height position 290 relative to the horizontal plane 280, where the third front trim height position 290 is below the first front trim height position 282, and to lower the second end of the vehicle 200 to a third rear trim height position 292 relative to the horizontal plane 280, where the third rear trim height position 292 is below the second rear trim height position 288 (FIG. 2). The third front trim height position 290 may be the same position as the second front trim height position 286 (FIG. 2), in an embodiment. In other embodiments, the third front trim height position 290 may be another position below the first front trim height position 282. In either case, the third front and third rear trim height positions 290, 292 may be positioned at which a headlight inclination angle α" of a centerline 276" of a light beam may be maintained within the predetermined acceptable range of angles. For example, in some cases, headlight inclination angle α" of the centerline 276" of the light beam may be less than headlight inclination angle α of the centerline 276 of the light beam and/or headlight inclination angle α' of the centerline 276' of the light beam. In any case, in an embodiment, the difference between the first front trim height position 282 and the third front trim height position 290 may be less than a difference between the first rear trim height position 284 and the third rear trim height position 292, in an embodiment. In other embodiments, the differences may not be equal to each other. The third front and rear trim height positions 290, 292 are trim heights at which the vehicle 100 may have less aerodynamic drag than when in the first or second front and rear trim height positions 282, 284, 286, 288. The method 300 may continue to block 310.

At block 310, a determination is made as to whether the vehicle speed is below a second speed threshold. For example, the speed sensor 51 (FIG. 1) may sense the vehicle speed and may provide a signal to the electronic control system 18 (FIG. 1) representing the vehicle speed. The electronic control system 18 may determine whether the vehicle speed is below the second speed threshold. The second speed threshold may be substantially equal to the first speed threshold, in an embodiment. In any case, however, the second speed threshold is a speed at which the vehicle 200 may be on a city street, or rough road that the vehicle 200 may need higher ground clearance. The first and second speed thresholds may be determined based on road condition, type of the vehicle, vehicle usage, etc. In an example, the second speed threshold may be in a range of from 20 mph to about 60 mph. In other embodiments, the speed threshold may be greater or less than the aforementioned range. In another embodiment, the first and second speed thresholds may not be equal. In any case, when the vehicle speed is below the second speed threshold, the electronic control system 18 provides a command to the suspension system 24 to reposition the first end of the body 14 to the first front trim height position 282 or another position that is above the second and third front trim height positions 286, 290 and to reposition the second end of the body to the first rear trim height position 284 or another position that is above the second and third rear trim height positions 288, 292 at block 312. The method may return to block 304. When the vehicle speed is above the second speed threshold, the method continues to block 314, which indicates that block 310 is to be reiterated.

Hence, when it is daytime, the vehicle will lower its front suspension less than its rear suspension, which may cause a centerline of a headlamp lightbeam to have a different inclination angle from the default angle. However, the different inclination angle will still be within the required inclination angle range. In such case, the vehicle may not include an automatic headlamp leveling system, which may decrease vehicle costs and vehicle mass. As a result, the vehicle's dynamic drag may be minimized, and its fuel economy may be improved. Moreover, by lowering the vehicle's trim height, vehicle stability may be improved. Although the aforementioned systems and methods may be included in new vehicles at the factory and are simple and relatively inexpensive to implement, the systems and methods may also be simple and relatively inexpensive to retrofit into existing vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. An automotive system for use with a vehicle, the vehicle including a body having a first end and a second end, wherein the first end of the body is positionable at a first front trim height position, and the second end of the body is positionable at a first rear trim height position, the system comprising:
   an ambient light sensor adapted to sense an ambient light intensity and to provide signals indicating the ambient light intensity;
   a speed sensor adapted to sense a vehicle speed;
   a suspension system coupled to the body and adapted to raise and lower the first end of the body relative to a horizontal plane and to raise and lower the second end of the body relative to a horizontal plane; and
   a controller in operable communication with the ambient light sensor, the speed sensor, and the suspension system, the controller configured to receive data from the ambient light sensor and the speed sensor and to provide commands to the suspension system,
   wherein:
   when the speed sensor senses that the vehicle speed is above a first speed threshold and the ambient light sensor senses that the ambient light intensity is below a first intensity threshold, the controller provides a first command to the suspension system to lower the first end of the body to a second front trim height position relative to the horizontal plane, where the second front trim height position is below the first front trim height position, and to lower the second end of the body to a second rear trim height position relative to the horizontal plane, where the second rear trim height position is below the first rear trim height position.

2. The automotive system of claim 1, wherein:
a difference between the first front trim height position and the second front trim height position and a difference between the first rear trim height position and the second rear trim height position are substantially equal to each other.

3. The automotive system of claim 1, wherein:
when the speed sensor senses that the vehicle speed is above the first speed threshold and when the ambient light sensor senses that the ambient light intensity is greater than the first intensity threshold, the controller provides a second command to the suspension system to lower the first end of the body to a third front trim height position relative to the horizontal plane, where the third front trim height position is below the first front trim height position, and to lower the second end of the body to a third rear trim height position relative to the horizontal plane, where the third rear trim height position is below the second rear trim height position.

4. The automotive system of claim 3, wherein:
a difference between the first front trim height position and the third front trim height position is less than a difference between the first rear trim height position and the third rear trim height position.

5. The automotive system of claim 1, wherein:
when the speed sensor senses that the vehicle speed is below a second speed threshold, the controller provides a second command to the suspension system to position the first end of the body to the first front trim height position and the second end of the body to the first rear trim height position.

6. The automotive system of claim 1, further comprising:
a headlamp system including a headlamp and a headlamp controller module, the headlamp in operable communication with the headlamp controller module, wherein the headlamp controller module is adapted to receive an operator input and to provide a command to the headlamp to turn on in response to the operator input.

7. The automotive system of claim 6, wherein:
the headlamp system further includes an actuator coupled to the headlamp, the actuator configured to move the headlamp between a first lamp position and a second lamp position;
the headlamp is configured to emit a light beam when disposed in the first lamp position, in which a centerline of the light beam is aimed at a first angle relative to the horizontal plane; and
the headlamp controller module is adapted to provide a command to the actuator to adjust the headlamp to the second lamp position, in which the centerline of the light beam is aimed at a second angle relative to the horizontal plane, wherein the first angle and the second angle are different.

8. The automotive system of claim 6, wherein:
the headlamp is disposed at a fixed position.

9. A method of operating a vehicle having a body including a first end and a second end, the first end of the body being positionable in a first front trim height position, and the second end of the body being positionable in a first rear trim height position, the method comprising the steps of:
receiving a first signal representative of a vehicle speed that is above a first speed threshold;
receiving a second signal representative of a first ambient light intensity that is below a first intensity threshold; and
providing a first command to a suspension system to lower the first end of the body to a second front trim height position relative to a horizontal plane, where the second front trim height position is below the first front trim height position, and to lower the second end of the body to a second rear trim height position relative to the horizontal plane, where the second rear trim height position is below the first rear trim height position, in response to receiving the first signal and the second signal.

10. The method of claim 9, wherein:
a difference between the first front trim height position and the second front trim height position is substantially equal to a difference between the first rear trim height position and the second rear trim height position.

11. The method of claim 9, further comprising the steps of:
receiving a third signal representative of a second ambient light intensity that is greater than the first ambient light intensity; and
providing a second command to the suspension system to lower the first end of the body to a third front trim height position relative to the horizontal plane, where the third front trim height position is below the first front trim height position, and to lower the second end of the vehicle to a third rear trim height position relative to the horizontal plane, where the third rear trim height position is below the second rear trim height position, in response to receiving the second signal.

12. The method of claim 11, wherein:
a difference between the first front trim height position and the third front trim height position is less than a difference between the first rear trim height position and the third rear trim height position.

13. The method of claim 9, further comprising the steps of:
receiving a third signal from the speed sensor indicating that the vehicle speed is below a second speed threshold; and
providing a third command to the suspension system to position the first end of the body to the first front trim height position and the second end of the body to the first rear trim height position.

14. The method of claim 9, wherein:
the vehicle further comprises a headlamp system including a headlamp and an actuator coupled to the headlamp, the headlamp is configured to emit a light beam when disposed in a first lamp position, wherein a centerline of the light beam is aimed at a first angle relative to the horizontal plane, and the actuator is configured to move the headlamp between the first lamp position and a second lamp position, in which the centerline of the light beam is aimed at a second angle relative to the horizontal plane, wherein the first angle and the second angle or different; and
the method further comprises providing a command to the headlamp system to actuate the actuator to adjust the headlamp to the second lamp position, in response to an operator input.

15. The method of claim 14, wherein:
a difference between the first front trim height position and the third front trim height position is less than a difference between the first rear trim height position and the third rear trim height position.

16. The method of claim 14, further comprising the steps of:
receiving a third signal from the speed sensor indicating that the vehicle speed is below a second speed threshold; and
providing a second command to the suspension system to reposition the first end of the body to the first front trim height position and the second end of the body to the first rear trim height position, in response to the third signal.

17. A method of operating a vehicle having a body, including a first end and a second end, the first end of the body being positionable in a first front trim height position, and the second end of the body being positionable a first rear trim height position, the method comprising the steps of:
receiving a first signal representative of a vehicle speed that is above a first speed threshold;
receiving a second signal representative of a first ambient light intensity that is below a first intensity threshold; and
providing a first command to a suspension system to lower the first end of the body of the vehicle to a second front trim height position relative to the horizontal plane, where the second front trim height position is below the first front trim height position, and to lower the second end of the vehicle to a second rear trim height position relative to the horizontal plane, in response to receiving the first signal and the second signal,
wherein:
a difference between the first front trim height position and the second front trim height position is substantially equal to a difference between the first rear trim height position and the second rear trim height position.

* * * * *